United States Patent Office 3,335,124
Patented Aug. 8, 1967

3,335,124
RATE-CONTROLLED VULCANIZATION OF
POLYETHYLENE
Hans R. Larsen, Montreal, Quebec, Canada, assignor to
Union Carbide Canada Limited, Toronto, Ontario,
Canada
No Drawing. Filed Nov. 15, 1963, Ser. No. 323,870
15 Claims. (Cl. 260—94.9)

This invention relates to the peroxide-catalyzed crosslinking of polyethylene. More particularly, this invention relates to a method for controlling the rate of the peroxide-catalyzed crosslinking of polyethylene to inhibit the premature crosslinking of polyethylene during processing.

Crosslinked polyethylene is known to be superior to uncrosslinked polyethylene for many applications. This superiority results because of improved properties of the crosslinked material, such as better resistance to environmental stress cracking, improved tensile impact strength and tensile strength, improved dimensional stability, decreased solubility and the like, when compared with uncrosslinked polyethylene. One method for effecting the crosslinking has been to blend polyethylene with a peroxide and, when desired, various pigments, fillers and the like, form the resulting blend to the desired configuration by various fabrication methods such as molding, extrusion and the like, and then heat the fabricated blend to a temperature sufficient to effect the crosslinking. The main drawback to this method has been the fact that the peroxides employed decompose at relatively low temperatures, often as low as about 130° C. Thus, to permit processing of the peroxide-containing polyethylene without significant premature crosslinking it is necessary to effect the processing at temperatures below about 135° C. The use of these low temperatures in an extrusion process results in low production rates and a rough surface on the extruded article. In addition, many of the peroxides employed for the crosslinking of low density polyethylene cannot be employed to crosslink high density polyethylene because of the higher temperatures required to process the high density material.

It has been found by this invention that if certain organic compounds are blended with the peroxide-containing polyethylene, processing of the blend can be effected at temperatures of up to about 150° C. without a significant degree of crosslinking occurring, but that crosslinking readily proceeds at a temperature of about 160° C. or higher.

The materials employed as crosslinking regulators in accordance with this invention can be divided into three general classes according to their main utility in the prior art. These are compounds heretofore generally employed as antioxidants, compounds heretofore generally employed as accelerators for the vulcanization of rubber, and compounds having utility both as antioxidants and vulcanization accelerators.

The compounds having antioxidant activity include various aromatic amines, phenolic compounds and ketone-aldehyde condensation products.

The aromatic amines which are known as antioxidants are represented by the formula:

(I) 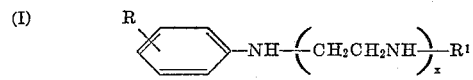

wherein $x$ is an integer having a value of from 0 to 1, inclusive; $R^1$, when $x$ is 1, is the

group and, when $x$ is 0, is hydrogen, the

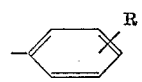

group or naphthyl; and R is hydrogen, alkyl or aralkyl of 1 to 7 carbon atoms, or amino. Illustrative examples of suitable aromatic amines are aniline, toluidine, toluene-2,4-diamine, N,N′ - diphenylethylenediamine, N,N′ - tolylethylenediamine, N-phenyl-2-naphthylamine and the like.

Phenolic compounds which can be employed include phenol-formaldehyde resins, preferably of the novolac type, as represented by the general formula (II) 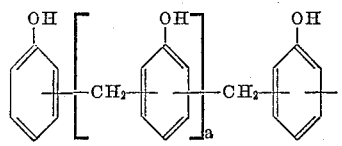

wherein $a$ is an integer having a value of 0 or greater, and preferably of from about 6 to 12, and the methylene groups are bonded to the phenol nuclei in positions ortho and para to the hydroxyl group, and phenolic compounds of the formula:

(III) 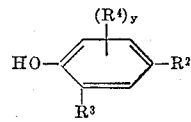

wherein $R^2$ is hydrogen, hydroxyl or

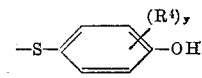

$R^3$ is hydrogen or

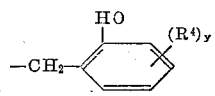

at least one of said $R^2$ and $R^3$ is hydrogen; $y$ is an integer having a value of from 1 to 3, inclusive; and $R^4$ is alkyl of 1 to 5 carbon atoms. Included in this class are 4-methyl-2,6-di-tert-butylphenol, 2,2′-methylene - bis(4-methyl-6-tert-butylphenol), 4,4′-thiobis(3-methyl - 6 - tert-butylphenol), 2,5-di-tert-butylhydroquinone, 2,5-di-tert-amylhydroquinone and the like.

The third class of anti-oxidant materials are the adducts of acetone with aniline or aniline substituted in the meta- or para-position with an alkyl group or an alkoxy group containing from 1 to 4 carbon atoms, or a phenyl group, such as p-phenetidine, toluidine, 4-aminobiphenyl, and the like. These compounds are believed to have the structure:

(IV) 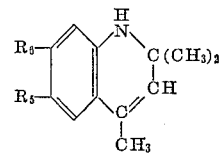

wherein each $R^5$ and $R^6$ is hydrogen, alkyl of 1 to 4 carbon atoms, alkoxy of from 1 to 4 carbon atoms or phenyl, at least one of said $R^5$ and $R^6$ being hydrogen.

The vulcanization accelerators which are employed in this invention are derivatives of 2-mercaptothiazole, sulfides of N,N-disubstituted dithiocarbamic acid, and thioureas.

The 2-mercaptothiazole derivatives can be represented by the formula:

$$R^7 \underset{S}{\overset{N}{\diagdown}} C-S(CH_2NH\overset{O}{\overset{\|}{C}}HNCH_2)_z R^9$$

wherein $z$ is an integer having a value of from 0 to 1, inclusive; when $z$ is 0, $R^9$ is hydrogen, cyclohexylamino, morpholino, a dialkylaminothiocarbonyl group whose alkyl groups each contain from 1 to 5 carbon atoms or the $$-S-C\underset{S}{\overset{N}{\diagdown}}\underset{R^8}{\overset{R^7}{}}$$

group; when $z$ is 1, $R^9$ is the $$-S-C\underset{S}{\overset{N}{\diagdown}}\underset{R^8}{\overset{R^7}{}}$$

group; $R^7$ and $R^8$, when taken alone, are hydrogen or alkyl of from 1 to 4 carbon atoms; and $R^7$ and $R^8$, when taken together, form the divalent $$-CH=CH-CH=CH-$$

group. As examples of suitable 2-mercaptothiazole derivatives one can mention 2-mercaptobenzothiazole, bis(2-benzothiazolyl) disulfide, N-cyclohexyl - 2 - benzothiazolesulfinamide, 1,3-bis(2-benzothiazolylthiomethylurea), 2-benzothiazolyl N,N - diethylthiocarbamoyl sulfide, 2-(morpholinothio)benzothiazole, bis(4,5 - dimethyl-2-thiazolyl)disulfide, bis(4-ethyl-2-thiazolyl) disulfide, and the like.

The second class of the compounds having vulcanization accelerating activity which can be employed in accordance with this invention are bis(N,N-disubstituted-thiocarbamoyl) sulfides of the formula:

(VI)  $$\underset{R^{11}}{\overset{R^{10}}{\diagdown}}N\overset{S}{\overset{\|}{C}}-S_n-\overset{S}{\overset{\|}{C}}N\underset{R^{11}}{\overset{R^{10}}{\diagup}}$$

where $n$ is an integer having a value of from 1 to 2 inclusive; $R^{10}$ and $R^{11}$, when taken alone, are alkyl or aralkyl of from 1 to 7 carbon atoms; and $R^{10}$ and $R^{11}$, when taken together, form the divalent pentamethylene group. Illustrations of compounds of this type are bis(dimethylthiocarbamoyl) sulfide, bis(dimethylthiocarbamoyl) disulfide, bis(dibenzylthiocarbamoyl) disulfide, bis(pentamethylenethiocarbamoyl) disulfide and the like.

The final class of compounds known as accelerators which can be employed in accordance with this invention are thioureas of the formula:

(VII)  $$\underset{R^{13}}{\overset{R^{12}}{\diagdown}}N\overset{S}{\overset{\|}{C}}N\underset{R^{13}}{\overset{R^{13}}{\diagup}}$$

wherein each $R^{12}$ and $R^{13}$ is selected from the group consisting of hydrogen, alkyl of from 1 to 4 carbon atoms and phenyl. Illuustrative of the thioureas are thiourea, dimethylthiourea, diphenylthiourea, (thiocarbanilide) and the like.

The third general class of compounds which can be employed in accordance with this invention are those having activity both as accelerators and antioxidants. These materials include metal salts of various sulfur-containing compounds and aldehyde-amine condensation products.

The metal salts which are suitably employed in this invention have the formula:

(VIII)  $$MX_s$$

wherein M is a polyvalent metal such as zinc, lead, copper, bismuth, tellurium, and selenium; $s$ is an integer having a value equal to the valence of the metal and is at least 2; and X is the benzothiazol-2-yl thio radical, an N,N-disubstituted thiocarbamoylthio radical of the formula:

(IX)  $$-S\overset{S}{\overset{\|}{C}}N\underset{R^{11}}{\overset{R^{10}}{\diagup}}$$

wherein $R^{10}$ and $R^{11}$ are as defined above, and an alkylzanthoyl radical of the formula:

(X)  $$-S\overset{S}{\overset{\|}{C}}OR^{14}$$

wherein $R^{14}$ is alkyl of from 1 to 4 carbons. Illustrative examples of the metal salts include the zinc salt of 2-mercaptobenzothiazole, zinc diethyldithiocarbamate, lead diethyldithiocarbamate, zinc dibenzyldithiocarbamate, zinc pentamethylenedithiocarbamate, zinc isopropoylxanthate, zinc n-butylxanthate and the like.

The amine/aldehyde adducts employed in accordance with this invention are produced by the reaction of ammonia or a primary amine, as represented by the formula $R^{15}NH_2$, wherein $R^{15}$ is hydrogen, alkyl of 1 to 4 carbons, phenyl, tolyl or naphthyl, with an aldehyde as represented by the formula $R^{16}$—CHO wherein $R^{16}$ is hydrogen, alkyl of 1 to 7 carbon atoms, or phenyl. Suitable amine compounds include ammonia, n-butylamine, aniline, toluidine, 1-naphthylamine and the like, and suitable aldehydes include formaldehyde, acetaldehyde, butyraldehyde, heptaldehyde, benzaldehyde and the like. Except for the ammonia-formaldehyde condensation product, hexamethylenetetramine, the structures of the reaction products are not definitely known, due to the fact that many of them polymerize. It is believed, however, that the products are monomers or polymers of monomers of the formula:

(XI)  $$R^{17}-N=CHR^{16}$$

wherein $R^{16}$ is as defined above, and $R^{17}$ is alkyl or aryl of 1 to 7 carbons. The tendency toward polymerization decreases as $R^{16}$ varies from hydrogen to alkyl to aryl and as $R^{17}$ varies from primary alkyl to tertiary alkyl to aryl. Thus, formaldehyde/n-alkyl amine adducts are generally in the form of polymers, whereas benzaldehyde/aniline adducts are relatively stable monomers. Nevertheless, these adducts are all suitable for use in accordance with this invention.

Preferred as regulators in accordance with this invention are the sulfur compounds heretofore known only as accelerators for the vulcanization of rubber. Most preferred are benzothiazole derivatives of the formula:

(XII)  $$\underset{S}{\overset{N}{\diagdown}}C-S\left[-S-C\underset{S}{\overset{N}{\diagup}}\right]_a (H)_b$$

wherein $a$ and $b$ each are integers having a value of from 0 to 1, inclusive, and the sum of $a+b$ is 1; and the bis (dialkylthiocarbamoyl)sulfides of the formula:

(XIII)  $$(alkyl)_2N\overset{S}{\overset{\|}{C}}S_c\overset{S}{\overset{\|}{C}}N(alkyl)_2$$

wherein $c$ is an integer having a value of from 1 to 2 inclusive and each alkyl group contains from 1 to 4 carbon atoms.

These materials are blended with polyethylene by methods known to those skilled in the art, such as banburying or milling at a temperature from about the crystalline melting point of the polyethylene up to about 150° C. The regulator, the peroxide and, if desired, various other additives such as fillers, pigments, and the like, can be added together or separately. It is preferred however, that the regulator be added prior to or concurrently with the peroxide to avoid premature crosslinking during blending.

The organic peroxides which are employed to crosslink the polyethylene are apparent to those skilled in the art, and include benzoyl peroxide, tert-butyl perbenzoate, di-α-cumylperoxide, di-tert-butyl perphthalate, di-tert-butyl peroxide, 2,5-dimethyl-2,5-di(tert-butylperoxy) hexane, bis(α,α-dimethyl-p-methylbenzyl) peroxide, bis(α,α-dimethyl-p-isopropylbenzyl) peroxide, tert-butyl α-cumyl peroxide, di-tert-amyl peroxide and the like. Additional examples are disclosed in U.S. Patent 2,826,570 and U.S. Patent 2,888,424. The amount of peroxide necessary to achieve a particular degree of crosslinking will vary with the time and temperature at which the crosslinking is conducted. In addition, more peroxide is required to obtain similar flow properties from a low molecular weight polyethylene than from a higher molecular weight polyethylene. In general, the amount required will be from about 0.05 to about 10 weight percent, based on the polyethylene, with an amount of from about 0.1 to about 5 weight percent being preferred.

The amount of crosslinking regulator employed will vary according to the severity of the conditions at which milling and processing of the blend before crosslinking are effected, with more regulator being required for the more severe conditions. It is preferred, however, to employ an amount sufficient to permit less than 30 percent crosslinking on heating for 10 minutes at 155° C. and yet permit about 100 percent or more crosslinking on heating for 10 minutes at 185° C. In general, this amount will fall in the range of from about 3 to about 67 weight percent, based on the peroxide employed, with amounts of from about 10 to about 43 percent being preferred.

The term "percent crosslinking," as employed in the specification and claims, has reference to an arbitrary scale based on the thermoplastic flows of untreated polyethylene and polyethylene which has been blended with 3 weight percent di-α-cumyl peroxide and heated at 185° C. for 10 minutes, with the former representing 0% crosslinking and the latter representing 100% crosslinking. Such a test, while not an absolute test, is a practical one in view of the fact that the ease of thermoplastic flow is inversely proportional to the degree of crosslinking. A convenient method for comparison comprises subjecting a weighed sample of polymer to a uniform pressure and temperature until flow has ceased and then measuring the area of the compressed sample. The area is inversely proportional to the degree of crosslinking. This test should be conducted at temperatures below 135° C. to prevent further crosslinking of peroxide-containing material during the test.

The polyethylene blends, when prepared as described above, are fabricated by conventional procedures such as molding, calendering, extrusion and the like at temperatures of up to about 150° C., and preferably from 130° C. to 150° C., and thereafter crosslinked by heating at 160° C. or above by conventional methods.

The following examples are illustrative.

*Example 1*

Each of several samples of a blend of polyethylene containing 2 weight percent carbon black and 0.02 weight percent 2,6-di-tert-butyl-para-cresol and having a melt index of about 2 dgm./min. was blended with 3 weight percent dicumyl peroxide and 1 weight percent of each of several different regulators on a two-roll laboratory mill at 130° C. for 5 minutes. Two samples of each blend were taken and cured by heating for 10 minutes at 155° C. or 185° C. The degree of crosslinking was determined by compressing 3 grams of the cured material in a hydraulic press at 135° C. and 540 p.s.i. for 5 minutes, and measuring the area of the compressed material, which decreases with an increase in crosslinking. The values so obtained were compared with values obtained from similar tests conducted with peroxide-free polyethylene and polyethylene blended with 3 percent dicumyl peroxide and no regulator, and then rated on a scale in which the value for the peroxide-free material represents 0% crosslinking and the value for the peroxide-containing regulator-free material represents 100% crosslinking.

These results are summarized in tabular form below:

| Regulator | Percent Crosslinked | |
|---|---|---|
| | 155° C. | 185° C. |
| 2-mercaptobenzothiazole* | 17.0 | 97.0 |
| Bis(2-benzothiazolyl) disulfide | 30.9 | 100.0 |
| Tetramethyl thuiram monosulfide | 65.1 | 108.7 |
| Tetraethyl thuiram disulfide | 27.6 | 101.0 |
| Diphenyl thiourea | 65.6 | 99.0 |
| Control | 100 | 100 |

*Concentration of 0.5 weight percent based on polyethylene.

*Example 2*

Polyethylene having a melt index of about 1.9 dgm./min. was blended with, based on the polyethylene, 2.5 weight percent carbon black, 0.2 weight percent 4,4'-thiobis (3-methyl-6-tert-butylphenoyl), 2.1 weight percent tert-butyl perbenzoate and 0.65 weight percent 2-mercaptobenzothiazole. Each of three samples of the resulting blend were heated for 10 minutes at 135° C., 155° C., or 185° C. The percent crosslinking observed for each of these samples was 1%, 9%, and 82%, respectively.

Similar tests were conducted on a blend of the same composition, except that the 2-mercaptobenzothiazole was omitted. The results of these tests are summarized in tabular form below:

| Temperature, °C. | Percent Crosslinked | |
|---|---|---|
| | Without Regulator | With Regulator |
| 135 | 56 | 1 |
| 155 | 80 | 9 |
| 185 | 109 | 82 |

*Example 3*

Employing procedures similar to those described in Example 2, samples of polyethylene containing 2 weight percent carbon black, 0.02 weight percent 2,6-di-tert-butyl-para-cresol, and 3.0 weight percent di-α-cumyl peroxide with and without 0.5 weight percent bis(dimethylthiocarbamyl) disulfide were evaluated for percent crosslinking. The results are set forth in tabular form below:

| Temperature, °C. | Percent Crosslinked | |
|---|---|---|
| | Without Retarder | With Retarder |
| 135 | 22 | 7 |
| 155 | 98 | 16 |
| 185 | 100 | 100 |

*Example 4*

Employing procedures similar to those described in Example 2, samples of polyethylene containing 2 weight percent carbon black, 0.02 weight percent, 2,6-di-tert-butyl-para-cresol, and 2.0 weight percent 2,5-dimethyl-2,5-di (tert-butylperoxy)hexane with and without 0.125 weight percent 2-mercaptobenzothiazole were evaluated for percent crosslinking. The results are summarized in tabular form below:

| Temperature, °C. | Percent Crosslinked | |
|---|---|---|
| | Without Retarder | With Retarder |
| 155 | 76 | 19 |
| 185 | 106 | 103 |

Example 5

Employing apparatus and procedures similar to those described in Example 1, several additional materials were tested as crosslinking retarders. The results are summarized in tabular form below:

| Retarder | Percent Crosslinked | |
|---|---|---|
| | 155° C. | 185° C. |
| Formaldehyde/p-toluidine condensation product | 38.4 | 107.7 |
| Phenol-formaldehyde resin (Novolac) | 64.8 | 109.2 |
| 4,4'-thiobis (3-methyl-6-tert-butylphenol) | 38.7 | 95.6 |
| N-phenyl-2-naphthylamine | 22 | 92 |

Example 6

Employing apparatus and procedures similar to those described in Example 1, the following materials were tested and found effective as crosslinking retarders.

(1) Hexamethylenetetramine;
(2) Butyraldehyde - monobutylamine condensation product;
(3) Zinc butylxanthate;
(4) Lead dimethyldithiocarbamate;
(5) Zinc salt of 2-mercaptobenzothiazole.

What is claimed is:

1. A heat curable composition comprising (1) polyethylene, (2) an organic peroxide in an amount sufficient to promote crosslinking of said polyethylene on heating, and (3) an organic crosslinking regulator selected from the group consisting of (a) an aromatic amine of the formula:

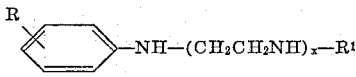

wherein $x$ is an integer having a value of from 0 to 1, inclusive; $R^1$, when $x$ is 1, is the

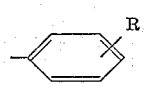

group and, when $x$ is 0, is a member selected from the group consisting of hydrogen, the

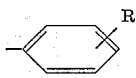

group and naphthyl; and R is selected from the group consisting of hydrogen, alkyl of 1 to 7 carbons, benzyl and amino; (b) a phenol-formaldehyde resin of the novolac type, (c) a phenolic compound of the formula:

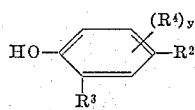

wherein $R^2$ is selected from the group consisting of hydrogen, hydroxyl and the

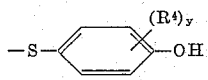

group; $R^3$ is selected from the group consisting of hydrogen and the

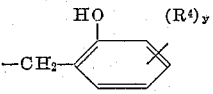

group; at least one of said $R^2$ and $R^3$ is hydrogen; $y$ is an integer having a value of from 1 to 3; and $R^4$ is alkyl of from 1 to 5 carbons; (d) an acetone/aromatic amine adduct represented by the formula:

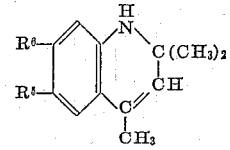

wherein each $R^5$ and $R^6$ is a member selected from the group consisting of hydrogen, alkyl of from 1 to 4 carbons, alkoxy of from 1 to 4 carbons and phenyl, at least one of said $R^5$ and $R^6$ being hydrogen; (e) a mercaptothiazole compound represented by the formula:

wherein $z$ is an integer having a value of from 0 to 1 inclusive; $R^9$, when $z$ is 0, is selected from the group consisting of hydrogen, cyclohexylamino, morpholino, a dialkylaminothiocarbonyl group whose alkyl groups each contain from 1 to 5 carbon atoms and the

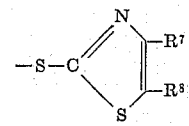

group, and, when $z$ is 1, is the

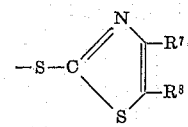

group; $R^7$ and $R^8$, when taken alone, are selected from the group consisting of hydrogen and alkyl of from 1 to 4 carbons; and $R^7$ and $R^8$, when taken together, form the divalent —CH=CHCH=CH— group; (f) a bis(N,N-disubstituted thiocarbamoyl) sulfide represented by the formula:

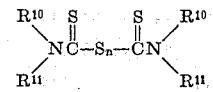

wherein $n$ is an integer having a value of from 1 to 2 inclusive; $R^{10}$ and $R^{11}$, when taken alone, are selected from the group consisting of alkyl of from 1 to 7 carbons and benzyl; and $R^{10}$ and $R^{11}$, when taken together, form the divalent pentamethylene group; (g) a metal salt of the formula:

$$MX_s$$

wherein M is a polyvalent metal selected from the group consisting of zinc, lead, copper, bismuth, tellurium and selenium; $s$ is an integer having a value equal to the valence of the metal and is at least 2; and X is a member selected from the group consisting of the benzothiazol-2-ylthio group, a disubstituted dithiocarbamoyl group of the formula:

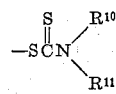

wherein $R^{10}$ and $R^{11}$ are as defined above, and an alkylxanthoyl radical of the formula:

wherein $R^{14}$ is alkyl of from 1 to 4 carbons; and (h) an adduct of a nitrogen compound of the formula $R^{15}NH_2$ wherein $R^{15}$ is a member selected from the group consisting of hydrogen, alkyl of from 1 to 4 carbons, phenyl, tolyl and naphthyl, with an aldehyde of the formula R$^{16}$CHO wherein R$^{16}$ is a member selected from the group consisting of hydrogen, alkyl of from 1 to 7 carbons and phenyl, said regulator being present in an amount sufficient to permit no more than 30% cross-linking on heating said composition for 10 minutes at 155° C.

2. A heat curable composition comprising (1) polyethylene, (2) an organic peroxide in an amount of from 0.05 to 10 weight percent, based on polyethylene, and (3) from 3 to 67 weight percent based on said peroxide, of a cross-linking regulator selected from the group consisting of (a) an aromatic amine of the formula:

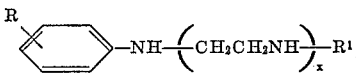

wherein $x$ is an integer having a value of from 0 to 1, inclusive; R$^1$, when $x$ is 1, is the

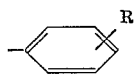

group and, when $x$ is 0, selected from the group consisting of hydrogen, the

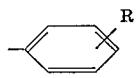

group and naphthyl; and R is selected from the group consisting of hydrogen, alkyl of 1 to 7 carbons, benzyl and amino; (b) a phenol-formaldehyde resin of the novolac type, (c) a phenolic compound of the formula:

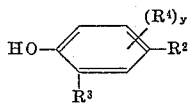

wherein R$^2$ is selected from the group consisting of hydrogen, hydroxyl and the

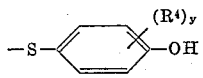

group; R$^3$ is selected from the group consisting of hydrogen and the

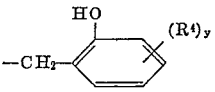

group; at least one of said R$^2$ and R$^3$ is hydrogen; $y$ is an integer having a value of from 1 to 3; and R$^4$ is alkyl of from 1 to 5 carbons; (d) an acetone/aromatic amine adduct represented by the formula:

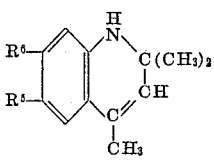

wherein each R$^5$ and R$^6$ is a member selected from the group consisting of hydrogen, alkyl of from 1 to 4 carbons, alkoxy of from 1 to 4 carbons and phenyl, at least one of said R$^5$ and R$^6$ being hydrogen; (e) a mercaptothiazole compound represented by the formula:

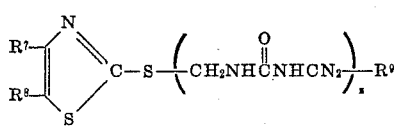

wherein $z$ is an integer having a value of from 0 to 1, inclusive; R$^9$, when $z$ is 0, is selected from the group consisting of hydrogen, cyclohexylamino, morpholino, a dialkylaminothiocarbonyl group whose alkyl groups each contain from 1 to 5 carbon atoms and the

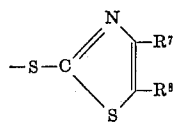

group, and when $z$ is 1, is the

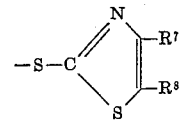

group; R$^7$ and R$^8$, when taken alone, are selected from the group consisting of hydrogen and alkyl of from 1 to 4 carbons; and R$^7$ and R$^8$, when taken together, form the divalent —CH=CHCH=CH— group; (f) a bis(N,N-disubstituted thiocarbamoyl) sulfide repersented by the formula:

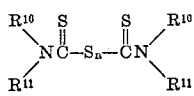

wherein $n$ is an integer having a value of from 1 to 2, inclusive; R$^{10}$ and R$^{11}$, when taken alone, are selected from the group consisting of alkyl of from 1 to 7 carbons and benzyl; and R$^{10}$ and R$^{11}$, when taken together, form the divalent pentamethylene group; (g) a metal salt of the formula:

$$MX_S$$

wherein M is a polyvalent metal selected from the group consisting of zinc, lead, copper, bismuth, tellurium and selenium; $s$ is an integer having a value equal to the valence of the metal and is at least 2; and X is a member selected from the group consisting of the benzothiazol-2-ylthio group, a disubstituted dithiocarbamoyl group of the formula:

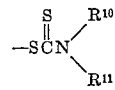

wherein R$^{10}$ and R$^{11}$ are as defined above, and an alkylxanthoyl radical of the formula:

wherein R$^{14}$ is alkyl of from 1 to 4 carbons; and (h) an adduct of a nitrogen compound of the formula R$^{15}$NH$_2$ wherein R$^{15}$ is a member selected from the group consisting of hydrogen, alkyl of from 1 to 4 carbons, phenyl, tolyl and naphthyl, with an aldehyde of the formula R$^{16}$CHO wherein R$^{16}$ is a member selected from the group consisting of hydrogen, alkyl of from 1 to 7 carbons and phenyl.

3. A heat curable composition comprising (1) polyethylene, (2) from 0.1 to 5 weight percent, based on said polyethylene of an organic peroxde, and (3) from 10 to 43 weght percent, based on said peroxide of a crosslinking regulator of the formula:

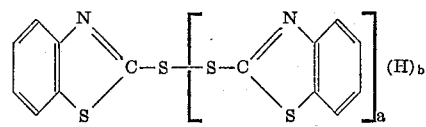

wherein $a$ and $b$ each are integers having a value of from 0 to 1 and the sum of $a+b$ is 1.

4. A heat curable composition comprising (1) polyethylene, (2) from 0.1 to 5 weight percent, based on said polyethylene, of an organic peroxide and (3) from 10 to 43 weight percent, based on said peroxide, of 2-mercaptobenzothiazole.

5. A heat curable composition comprising (1) polyethylene, (2) from 0.1 to 5 weight percent, based on said polyethylene, of an organic peroxide and (3) from 10 to 43 weight percent, based on said peroxide, of a bis(dialkylthiocarbamoyl) sulfide of the formula:

wherein $c$ is an integer having a value of from 1 to 2 and each alkyl group contains from 1 to 4 carbon atoms.

6. A heat curable composition comprising (1) polyethylene, (2) from 0.1 to 5 weight percent, based on said polyethylene, of an organic peroxide, and (3) from 10 to 43 weight percent, based on said peroxide, of bis(dimethylthiocarbamoyl) disulfide.

7. The process for producing an article of manufacture of cured polyethylene which comprises fabricating at a temperature of below about 150° C. a composition comprising (1) polyethylene, (2) an organic peroxide in an amount sufficient to promote crosslinking of said polyethylene on heating, and (3) an organic crosslinking regulator selected from the group consisting of (a) an aromatic amine of the formula:

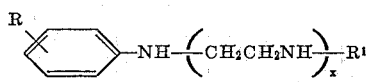

wherein $x$ is an integer having a value of from 0 to 1, inclusive; $R^1$, when $x$ is 1, is the

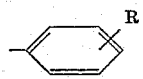

group and, when $x$ is 0, is selected from the group consisting of hydrogen, the

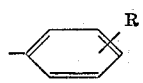

group and naphthyl; and R is selected from the group consisting of hydrogen, alkyl of 1 to 7 carbons, benzyl and amino; (b) a phenol-formaldehyde resin, (c) a phenolic compound of the formula:

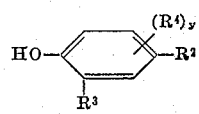

wherein $R^2$ is selected from the group consisting of hydrogen, hydroxyl and the

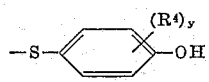

group; $R^3$ is selected from the group consisting of hydrogen and the

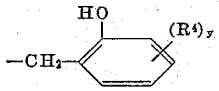

group; at least one of said $R^2$ and $R^3$ is hydrogen; $y$ is an integer having a value of from 1 to 3; and $R^4$ is alkyl of from 1 to 5 carbons; (d) an acetone/aromatic amine adduct represented by the formula:

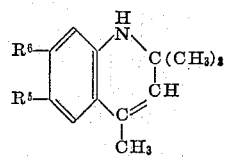

wherein each $R^5$ and $R^6$ is a member selected from the group consisting of hydrogen, alkyl of 1 to 4 carbons, alkoxy of from 1 to 4 carbons and phenyl, at least one of said $R^5$ and $R^6$ being hydrogen; (e) mercaptothiazole compound represented by the formula:

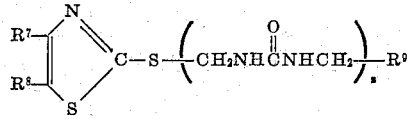

wherein $z$ is an integer having a value of from 0 to 1, inclusive; $R^9$, when $z$ is 0, is selected from the group consisting of hydrogen, cyclohexylamino, morpholino, a dialkylaminothiocarbonyl group whose alkyl groups each contain from 1 to 5 carbon atoms and the

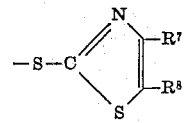

group; $R^7$ and $R^8$, when taken alone, are selected from the group consisting of hydrogen and alkyl of from 1 to 4 carbons; and $R^7$ and $R^8$, when taken together, form the divalent —CH=CHCH=CH— group; (f) a bis(N,N-disubstituted thiocarbamoyl) sulfide represented by the formula:

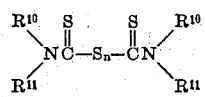

wherein $n$ is an integer having a value of from 1 to 2, inclusive; $R^{10}$ and $R^{11}$, when taken alone, are selected from the group consisting of alkyl of from 1 to 7 carbons and benzyl; and $R^{10}$ and $R^{11}$, when taken together, form the divalent pentamethylene group; (g) a metal salt of the formula:

$$MX_s$$

wherein M is a polyvalent metal selected from the group consisting of zinc, lead, copper, bismuth, tellurium and selenium, $s$ is an integer having a value equal to the valence of the metal and is at least 2; and X is a member selected from the group consisting of the benzothiazol-2-ylthio group, a disubstituted dithocarbamoyl group of the formula:

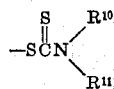

wherein $R^{10}$ and $R^{11}$ are as defined above, and an alkylxanthoyl radical of the formula:

wherein $R^{14}$ is alkyl of from 1 to 4 carbons; and (h) an adduct of a nitrogen compound of the formula $R^{15}NH_2$ wherein $R^{15}$ is a member selected from the group consisting of hydrogen, alkyl of from 1 to 4 carbons, phenyl, tolyl and naphthyl, with an aldehyde of the formula $R^{16}CHO$ wherein $R^{16}$ is a member selected from the group consisting of hydrogen, alkyl of from 1 to 7 carbons and phenyl, said regulator being present in an amount sufficient to permit no more than 30% crosslinking on heating said composition for 10 minutes at 155° C. and thereafter curing said composition at a temperature of at least 160° C.

8. The process for producing an article of manufacture of cured polyethylene which comprises fabricating at a temperature of below about 150° C. a composition comprising (1) polyethylene, (2) an organic peroxide in an amount of from 0.05 to 10 weight percent, based on polyethylene, and (3) from 3 to 67 weight percent, based on said peroxide, of a crosslinking regulator selected from the group consisting of (a) an aromatic amine of the formula:

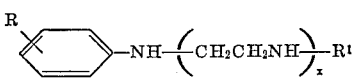

wherein $x$ is an integer having a value of from 0 to 1 inclusive; $R^1$, when $x$ is 1, is the

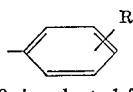

group and, when $x$ is 0, is selected from the group consisting of hydrogen, the

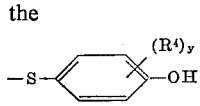

group and naphthyl; and R is selected from the group consisting of hydrogen, alkyl of 1 to 7 carbons, benzyl and amino; (b) a phenol-formaldehyde resin, (c) a phenolic compound of the formula:

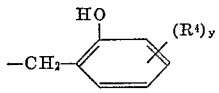

wherein $R^2$ is selected from the group consisting of hydrogen, hydroxyl and the

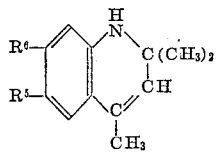

group; $R^3$ is selected from the group consisting of hydrogen and the

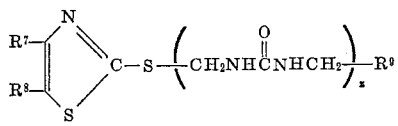

group; at least one of said $R^2$ and $R^3$ is hydrogen; $y$ is an integer having a value of from 1 to 3; and $R^4$ is alkyl of from 1 to 5 carbons; (d) an acetone/aromatic amine adduct represented by the formula:

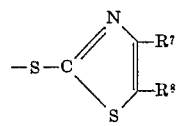

wherein each $R^5$ and $R^6$ is a member selected from the group consisting of hydrogen, alkyl of from 1 to 4 carbons, alkoxy of from 1 to 4 carbons and phenyl, at least one of said $R^5$ and $R^6$ being hydrogen; (e) a mercaptothiazole compound represented by the formula:

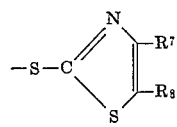

wherein $z$ is an integer having a value of from 0 to 1 inclusive; $R^9$, when $z$ is 0, is selected from the group consisting of hydrogen, cyclohexylamino, morpholino, a dialkylaminothiocarbonyl group whose alkyl groups each contain from 1 to 5 carbon atoms and the

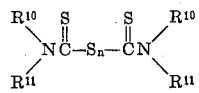

group, and, when $z$ is 1, is the

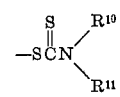

group; $R^7$ and $R^8$, when taken alone, are selected from the group consisting of hydrogen and alkyl of from 1 to 4 carbons; and $R^7$ and $R^8$, when taken together, form the divalent —CH=CHCH=CH— group; (f) a bis(N,N-disubstituted thiocarbamoyl) sulfide represented by the formula:

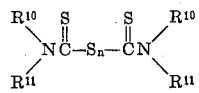

wherein $n$ is an integer having a value of from 1 to 2, inclusive; $R^{10}$ and $R^{11}$, when taken alone, are selected from the group consisting of alkyl of from 1 to 7 carbons and benzyl; and $R^{10}$ and $R^{11}$, when taken together, form the divalent pentamethylene group; (g) a metal salt of the formula:

$$MX_s$$

wherein M is a polyvalent metal selected from the group consisting of zinc, lead, copper, bismuth, tellurium and selenium; $s$ is an integer having a value equal to the valence of the metal and is at least 2; and X is a member selected from the group consisting of the benzothiazol-2-ylthio group, a disubstituted dithiocarbamoyl group of the formula:

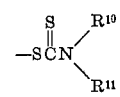

wherein $R^{10}$ and $R^{11}$ are as defined above, and an alkylxanthoyl radical of the formula:

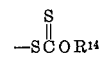

wherein $R^{14}$ is alkyl of from 1 to 4 carbons; and (h) an adduct of a nitrogen compound of the formula $R^{15}NH_2$ wherein $R^{15}$ is a member selected from the group consisting of hydrogen, alkyl of from 1 to 4 carbons, phenyl, tolyl and naphthyl, with an aldehyde of the formula $R^{16}CHO$ wherein $R^{16}$ is a member selected from the group consisting of hydrogen, alkyl of from 1 to 7 carbons and phenyl, and thereafter curing said composition at a temperature of at least 160° C.

9. The process for producing an article of manufacture of cured polyethylene which comprises fabricating at a temperature of below about 150° C. a composition comprising (1) polyethylene, (2) from 0.1 to 5 weight percent, based on said polyethylene, of an organic peroxide, and (3) from 10 to 43 weight percent, based on said peroxide, of a cross-linking regulator of the formula:

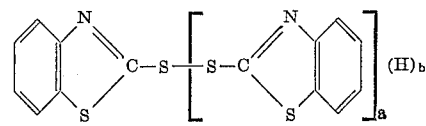

wherein $a$ and $b$ are integers having a value of from 0 to 1 and the sum of $a+b$ is 1, and thereafter curing said composition at a temperature of at least 160° C.

10. The process for producing an article of manufacture of cured polyethylene which comprises fabricating at a temperature of below about 150° C. a composition comprising (1) polyethylene, (2) from 0.1 to 5 weight percent, based on said polyethylene, of an organic peroxide and (3) from 10 to 43 weight percent, based on said peroxide, of 2-mercaptobenzothiazole, and thereafter curing said composition at a temperature of at least 160° C.

11. The process for producing an article of manufacture of cured polyethylene which comprises fabricating at a temperature of below about 150° C. a composition comprising (1) polyethylene, (2) from 0.1 to 5 weight percent, based on said polyethylene, of an organic peroxide and (3) from 10 to 43 weight percent, based on said peroxide, of a bis(dialkylthiocarbamoyl) sulfide of the formula:

wherein $c$ in an integer having a value of from 1 to 2 and each alkyl group contains from 1 to 4 carbon atoms, and thereafter curing said composition at a temperature of at least 160° C.

12. The process for producing an article of manufacture of cured polyethylene which comprises fabricating at a temperature of below about 150° C. a composition comprising (1) polyethylene, (2) from 0.1 to 5 weight percent, based on said polyethylene, of an organic peroxide, and (3) from 10 to 43 weight percent, based on said peroxide, of bis(dimethylthiocarbamoyl) disulfide, and thereafter curing said composition at a temperature of at least 160° C.

13. A process as defined in claim 10 wherein the said polyethylene has a melt index of from 1.9 dgm./min. or 2.0 dgm./min.

14. A process as defined in claim 10 wherein the said polyethylene has a melt index of 2.0 dgm./min. and contains 2 weight percent carbon black and 0.02 weight percent 2,6-di-tert-butyl-para-cresol.

15. A heat curable composition comprising (1) polyethylene having a melt index of about 2 dgm./min. (2) about 3 weight percent of dicumyl peroxide and about 1 weight percent of 2-mercaptobenzothiazole.

References Cited
UNITED STATES PATENTS

| | | | |
|---|---|---|---|
| 2,582,510 | 1/1952 | Stiratelli | 260—79.5 X |
| 3,000,866 | 9/1961 | Tarney | 260—79.5 X |
| 3,050,494 | 8/1962 | Robbins et al. | 260—94.9 |
| 3,238,176 | 3/1966 | Brooks et al. | 260—94.9 |

JOSEPH L. SCHOFER, *Primary Examiner.*

JAMES A. SEIDLECK, *Examiner.*

D. K. DENENBERG, *Assistant Examiner.*